June 28, 1966 SHIGEO AIKI ET AL 3,257,811
VEHICLE BRAKE EQUIPPED WITH A BOOSTER APPARATUS
Filed April 14, 1965
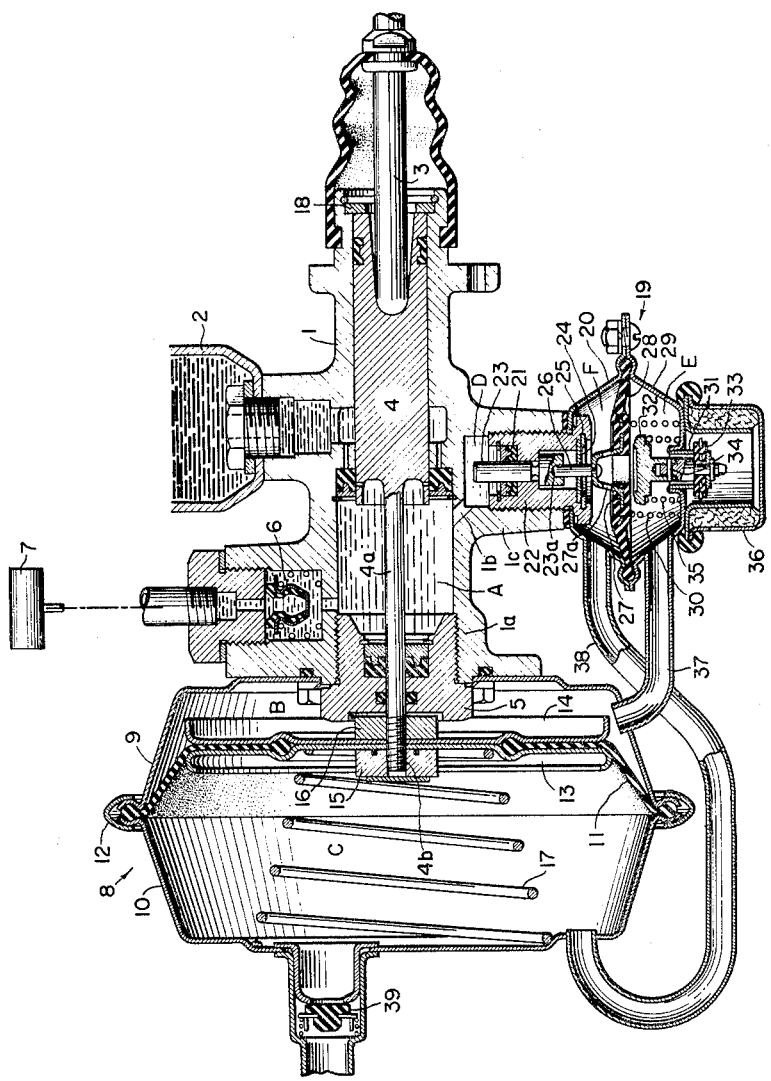

3,257,811
VEHICLE BRAKE EQUIPPED WITH A BOOSTER APPARATUS

Shigeo Aiki and Tooru Hamada, both of Kariya, Japan, assignors to Aichi Kogyo Kabushiki-Kaisha, Kariya, Japan
Filed Apr. 14, 1965, Ser. No. 448,164
Claims priority, application Japan, Apr. 17, 1964, 39/49,456
2 Claims. (Cl. 60—54.6)

The invention relates to a vehicle brake equipped with a booster, in which the booster device is arranged concentrically with respect to the master cylinder and is provided with a specifically designed control valve device adapted to be actuated by increased oil pressure in the master cylinder for controlling the booster to increase the oil pressure to be conveyed to the wheel cylinders. The object of the invention is to provide such brake which is simple in construction, economical to manufacture, can readily be assembled, and is reliable in operation.

The accompanying drawing shows a longitudinal sectional view of the apparatus according to this invention, illustrating a specific embodiment thereof, in order that its utility and functioning will be thoroughly appreciated. It will be understood, however, that this is by way of illustration only and is not to be taken as limiting the invention in any way.

Referring to the drawing, 1 designates a master cylinder of a vehicle brake device provided with an oil reservoir 2. 3 is a push rod for a piston 4 which has a piston rod extension $4_a$ having at its extremity a screw threaded portion $4_b$. 5 is a plug which is threaded into the front open end $1_a$ of the master cylinder 1 and supporting said piston rod extension $4_a$. 6 is an outlet valve located in the oil passage between the chamber A of the master cylinder 1 and the wheel cylinders diagrammatically shown as 7.

8 is a booster drum concentrically arranged with respect to the master cylinder 1 and composed of two shells 9 and 10, of which the back shell half 9 is secured to the front end of the master cylinder. Said booster drum 8 is divided into two air chambers B and C by means of a diaphragm 11, the periphery of which is united together with the flanges of the two shell halves 9 and 10 by means of a clamp 12. The central portion of the diaphragm 11 is clamped between clamping members 13 and 14, which members are held by lock nuts 15 and 16 secured to the screw threaded front end $4_b$ of the piston rod extension $4_a$. The diaphragm 11 is normally biased toward the right by means of a spring 17 provided in the air chamber C.

In a boss $1_c$ of the master cylinder 1, an oil chamber D is provided which is in communication with the oil chamber A through a channel $1_b$. With respect to said boss $1_c$, there is provided a control valve device generally designated as 19. 22 is a control valve cylinder which is thread fitted into a cavity forming the oil chamber D. In said cylinder 22, there is inserted a control piston 23 through a packing 21. At the lower end of the cylinder 22 there is a stop disc 24 held by a snap ring 25. Through said stop disc 24 there is inserted a pin 26 engaging with a cavity $23_a$ formed at the lower end of the control piston 23. 28 is a control diaphragm secured at its periphery between two shells 20 and 29 forming a control drum. A supporting plate 27 having air orifices $27_a$ is embedded in said diaphragm 28 and is secured to the lower end of said pin 26. The diaphragm 28 is normally biased upwardly by means of a spring 30. A cylindrical valve seat 31 is secured to the central portion of the lower shell 29. 32 is a vacuum valve of which the stem is inserted into said valve seat 31. The valve 32 is connected with an air valve 33 by means of a pin 34. A spring 35 is provided between the vacuum valve 32 and the lower shell 29, said spring normally biassing the air valve 33 against the valve seat 31, and the diaphragm 28 is normally held apart from the vacuum valve 32. On the above mentioned control valve device 19, there is mounted a suitable air cleaner 36 adapted for cleaning the air introduced through the control valve device.

The interior of the drum of the control valve device formed of the shells 20 and 29 is divided into two air chambers E and F, and these chambers are connected to the air chambers B and C, respectively, of the booster drum 8 by means of pipes 37 and 38, respectively. The air chamber C is also connected to a negative pressure source or accumulator (not shown) through a check valve 39. Said four air chambers B, C, E and F are normally maintained under equal negative pressure.

With respect to the device as mentioned above, it is essential that the device is so designed that the ratio of cross-sectional area $B_1$ of the control piston 23 to the cross-sectional area $B_2$ of the drum of the control valve device 19 is greater than the ratio of the cross-sectional area $A_1$ of the master cylinder 1 (minus the cross-sectional area of the connecting rod $4_a$) to the cross-sectional area $A_2$ of the booster drum 8.

The operation of the present invention is as follows: When a brake pedal is actuated, through the push rod 3 the piston 4 will be pushed forwardly against the action of the spring 17, increasing the oil pressure in the oil chamber A, whereby the oil pressure in the wheel cylinders 7 will be increased to apply the braking action. At the same time, through the channel $1_b$ the oil pressure in the chamber D is also increased, and the control piston 23 and the control diaphragm 28 connected thereto will be shifted against the action of the spring 30, whereby the diaphragm 28 will abut against the vacuum valve 32. As a result, the communication between the air chambers E and F through the orifice $27_a$ in the supporting plate 27, i.e. the communicating of the air chambers B and C in the booster drum 8, will be shut off. As the oil pressure in the chambers A and D further increases, by further movement of the control piston 23 the diaphragm 28 and the vacuum valve 32 will be further shifted against the action of the springs 30 and 35, whereby the air valve 33 will be released from the valve seat 31. Consequently, the air coming through the air cleaner 36 will pass through the clearance produced between the valve assembly 32–33 and the valve seat 31, and it is rapidly introduced into the air chamber B through the air chambers E and the pipe 37. Thus, in co-operation with the braking action through the actuation of the brake pedal, the booster diaphragm 11 and the piston 4 will be moved frontwardly by the pressure difference between the air chambers B and C, so that the increased oil pressure in the oil chamber A of the master cylinder 1 will act on the wheel cylinders, thereby intensifying the braking action. When the pressure on the brake pedal is released, the piston 4 is retracted under the oil pressure in the oil chamber A, the oil pressure is decreased, and the control valve device 19 will be returned to its initial position.

From the foregoing description it will be seen, according to the present invention, that the booster drum having the booster diaphragm is arranged concentrically with respect to the master cylinder and that the booster diaphragm is directly connected with the piston of the master cylinder, dispensing with the oil pressure booster unit separately provided in the conventional brake booster apparatus, so that the apparatus according to this invention is simple in construction and can be readily assembled in contradistinction to the conventional brake booster apparatus, and the substantial benefits of the booster may still be realized.

What we claim is:

1. A vehicle brake apparatus having a booster, said apparatus comprising a master cylinder, a piston extending into one end of said master cylinder and having a connecting rod extending out of the other end of said master cylinder, wheel cylinders in communication with said master cylinder, a booster drum mounted on the other end of said master cylinder, a spring pressed diaphragm dividing said booster drum into two air chambers, one adjacent said master cylinder and one remote from said master cylinder, said diaphragm being connected directly to said connecting rod, a control valve device having a control cylinder communicating with said master cylinder, a control piston in said control cylinder adapted to be actuated by the fluid pressure in said master cylinder, a valve drum on said control valve device having a diaphragm moved by said control piston and dividing said valve drum into two chambers, one adjacent said control valve device and the other remote from said control valve device, said remote booster drum air chamber and the adjacent valve drum chamber being in communication and having means for connecting them with a source of negative pressure, the adjacent booster drum air chamber being in communication with the remote control valve drum chamber, a normally closed air valve in said control valve drum opening into said remote control valve drum chamber from outside said control valve drum, normally open valve means in said control valve drum diaphragm which is closed when said diaphragm is moved toward said remote chamber a predetermined distance, whereby when said piston is moved into said master cylinder, fluid pressure acts on said control valve to move said control valve drum diaphragm toward said remote control valve drum chamber and close said normally open valve means and open said normally closed valve means and air pressure is admitted to said remote control valve drum chamber and through said chamber into the adjacent booster drum chamber for urging said booster chamber diaphragm in the same direction as said piston.

2. A vehicle brake apparatus as claimed in claim 1 in which the ratio of the cross sectional area of the control piston to the cross sectional area of said control valve drum is greater than the ratio of the cross sectional area of master cylinder, less the cross sectional area of said connecting rod, to the cross sectional area of the booster drum.

References Cited by the Examiner
UNITED STATES PATENTS

| | | | |
|---|---|---|---|
| 1,472,801 | 11/1923 | Longhead | 60—54.6 X |
| 2,098,666 | 11/1937 | LaBrie | 60—54.6 |
| 2,670,603 | 3/1954 | Allin et al. | 60—54.5 |
| 2,904,960 | 9/1959 | Aikman | 60—54.6 |
| 2,938,348 | 5/1960 | Price et al. | 60—54.6 |

SAMUEL LEVINE, *Primary Examiner.*

ROBERT R. BUNEVICH, *Examiner.*